Aug. 28, 1928.  
J. BILBAO  
1,682,263  
AIRCRAFT  
Filed Sept. 17, 1926  4 Sheets-Sheet 1

INVENTOR.
Jose' Bilbao
BY
B. Singer
ATTORNEY.

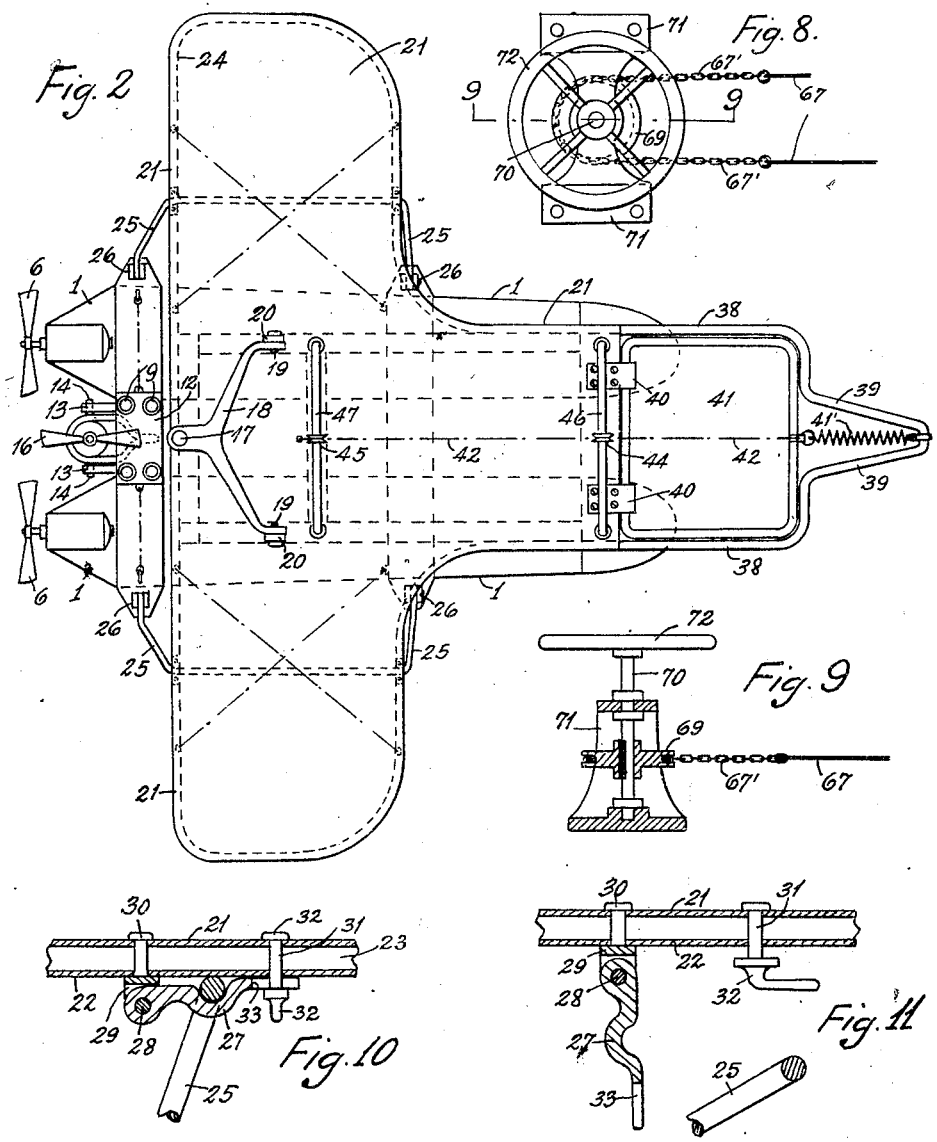

Aug. 28, 1928.

J. BILBAO

AIRCRAFT

Filed Sept. 17, 1926    4 Sheets-Sheet 3

1,682,263

INVENTOR.
José Bilbao
BY
B. Singer
ATTORNEY

Aug. 28, 1928.
J. BILBAO
1,682,263
AIRCRAFT
Filed Sept. 17, 1926    4 Sheets-Sheet 4
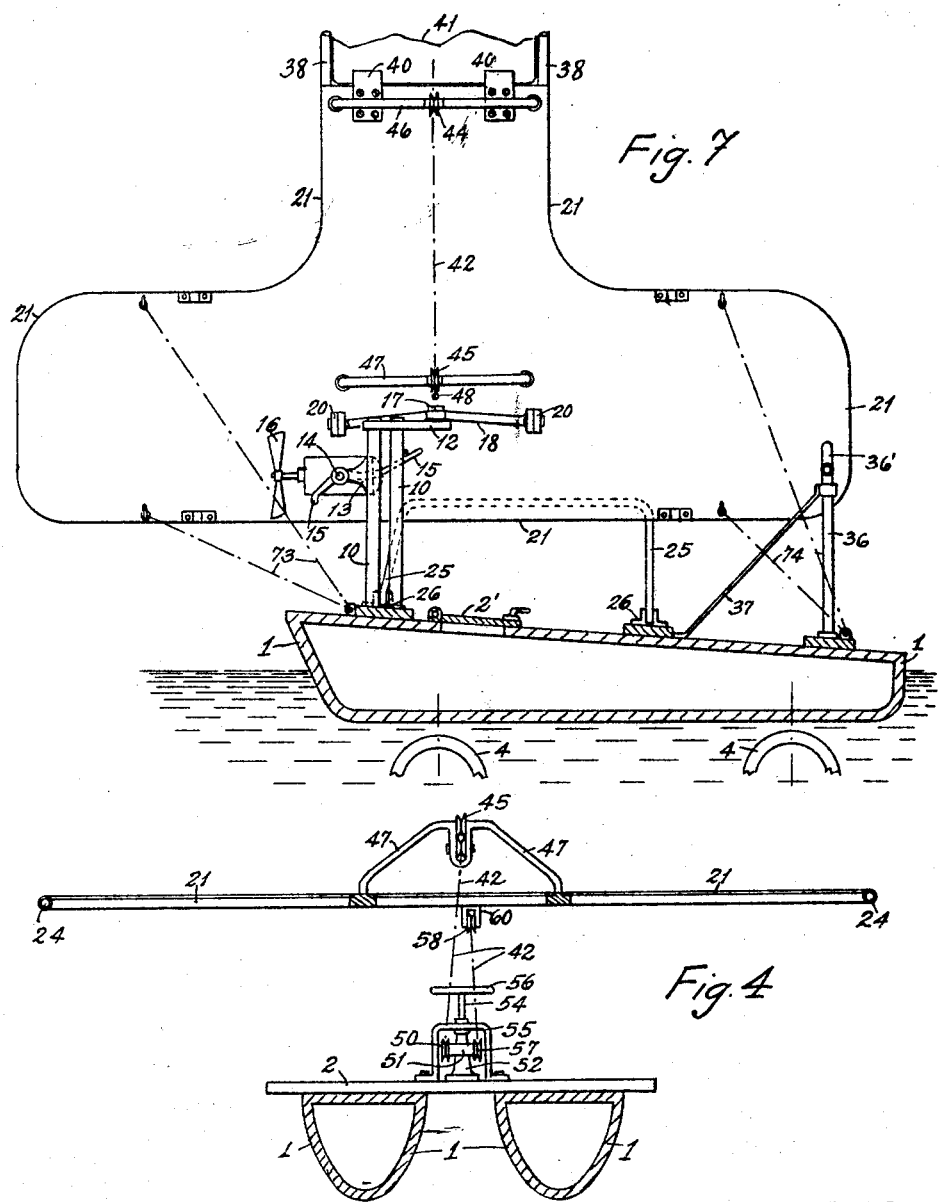

Patented Aug. 28, 1928.

1,682,263

UNITED STATES PATENT OFFICE.

JOSÉ BILBAO, OF HABANA, CUBA.

AIRCRAFT.

Application filed September 17, 1926, Serial No. 136,137, and in Cuba August 28, 1926.

This invention relates to aircrafts and its object, primarily, is to provide an aircraft having the depth rudder—like a bird's tail—located on the rear and means to actuate same from the cockpit or place occupied by the pilot.

A further object of the invention is to provide a single plane aircraft or monoplane, with a plane suitably mounted so as to turn in two directions to come up vertically in a ship's sail like fashion, in order to reduce considerably the space covered by a craft of this type when it is running aground or navigatin gon water, without constituting a serious danger for pedestrians, as it happens at present, when the majority of personal casualties occasioned by aircrafts may be traced to the wings of these, besides their being exposed to damage by collision against any material object in the surface of the ground or water level.

Another object of this invention is to provide an aircraft of the amphibian variety, that is, an aeroplane and hydroplane in one, that may travel either on land or water alike.

A further object of the invention is to provide an aircraft of that particular kind having a propeller and its shaft on the rear or tail of same, for propelling the craft as a boat when these become submerged in the liquid mass.

And finally, another object of the invention is to provide this kind of craft with a propeller of vertical shaft yet capable of changing its position through an angle of 90 degrees, so that it may be used for climbing and coming down directly in the air, without it being a hindrance to the horizontal motion of the airplane.

The invention is described with reference to the figures of the annexed drawings, in which:

Fig. 2 is an upper plan view of same.

Fig. 4 is a transverse vertical section on the line 4—4 of Fig. 1.

Fig. 7 is a longitudinal vertical section of the craft with the wing raised like the sail of a ship.

Fig. 8 is a detail top view showing the rudder actuating means for terrestrial and maritime navigation.

Fig. 9 is a vertical section on line 9—9 of Fig. 8.

Fig. 10 is a detail view showing in transverse vertical section a portion of the wing together with one of the horizontal position holding means, showing the clamp closed.

Figure 1:
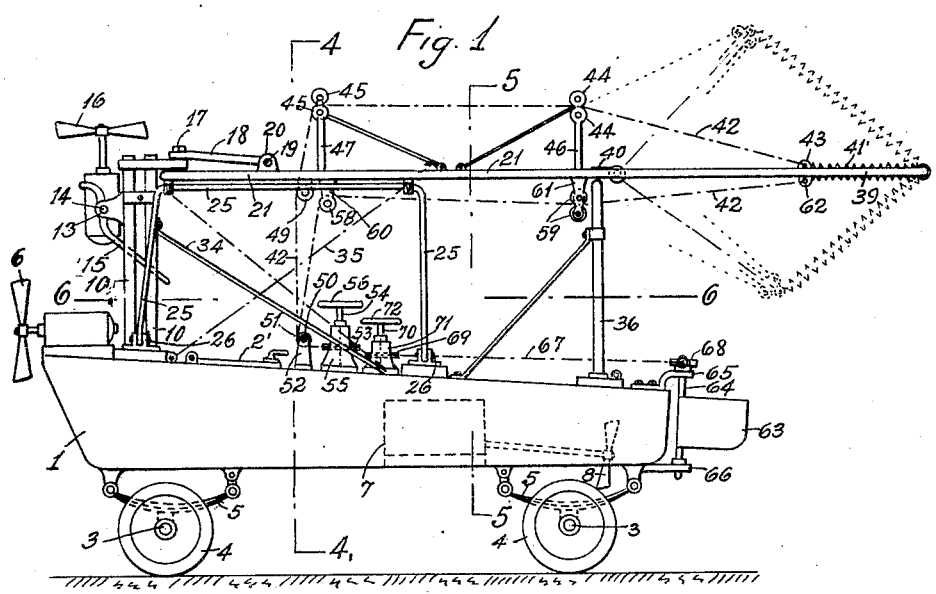
Fig. 1 is a side elevation of a monoplane built in accordance with this invention.
Figure 6:
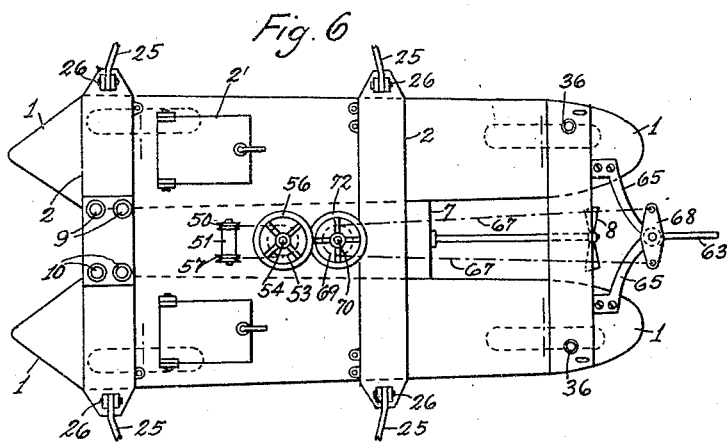
Fig. 6 is a horizontal section on the line 6—6 of Fig. 1.
Figure 3:
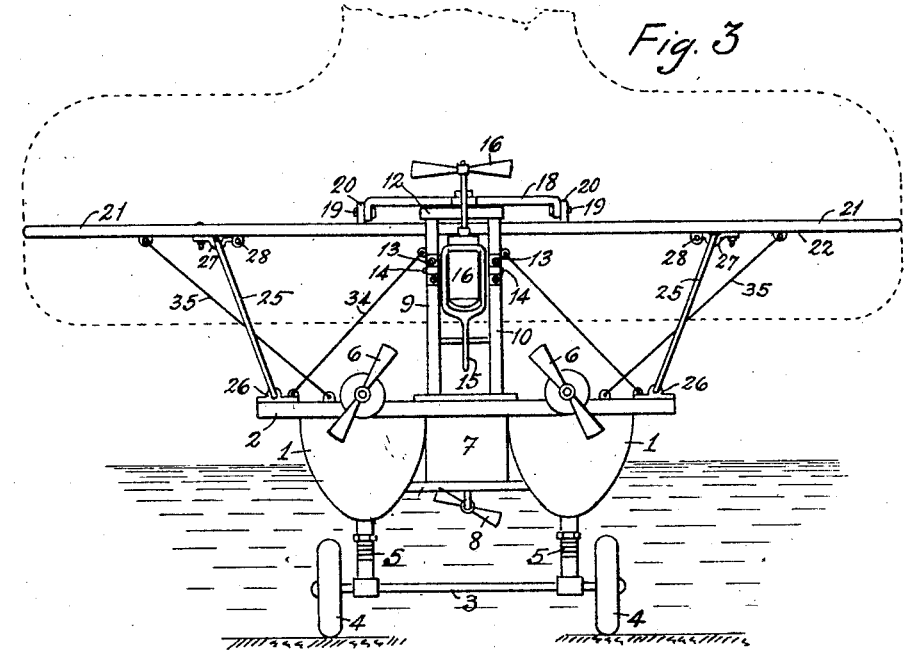
Fig. 3 is a front elevation of same.

And Fig. 11 is a view similar to No. 10, but showing the clamp open.

The craft consists of a structure formed by two cages or floats 1, long and narrow, that may be metallic or wooden, lined with rubberized fabric, and which are joined a short distance to one another by a platform 2, located above same, and presenting two landing sets below the floats, each of which landing sets consists of a transverse horizontal shaft 3 carrying two pneumatic wheels 4, attached to the cage or float 1 by means of sheet spring suspensions 5. The platform 2 is provided with closed openings and doors 2' for gaining access to the interior of the floats 1. On the front end of each float 1 is firmly mounted a propelling means 6, consisting of a motor and its propeller, and between the two floats 1, there is a case 7, firmly secured to same and housing a motor for a propeller 8 designed to propel the ship during water navigation, since the propeller will be submerged in water when the craft is resting on the surface of a body of liquid, such as the sea, a lake or a river. On the fore end of platform 2 and in its middle portion, there are two mountings 9 and 10, each consisting of two posts and joined together by an upper base 12; on said mountings there are fixed two brackets projecting forward, 13, on which is pivotally mounted, by means of horizontal trunnions 14, a rotary frame 15, carrying a propeller 16 which normally is in a vertical position, and serves for the craft to climb up and descend vertically, though when the airplane is speeding in an horizontal or inclined plane, the frame 15 and said propeller 16 may be made to turn until they are in a horizontal position (Fig. 7) so that they have no influence in the vertical displacement of the craft. On the projecting rear section of the supporting base 12 is a yoke 18 mounted on a vertical pivot 17 and carrying on its end two horizontal pivots that form pivoting shafts for vertical lugs 20 that project upward on the single wing of the craft, which is of monoplane type, said wing being made of a double aluminum sheet with an interspacing 23

Figure 5:
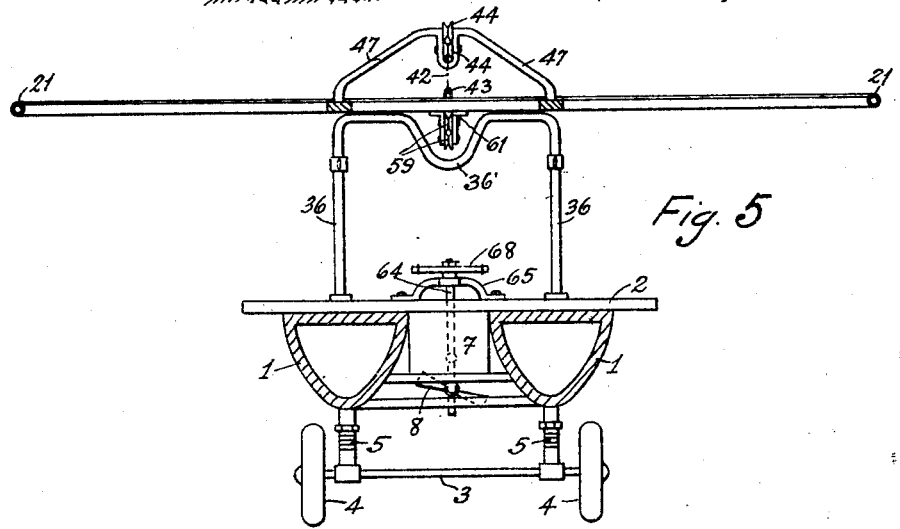
Fig. 5 is a transverse vertical section on the line 5—5 of Fig. 1.

(Figs. 10 and 11) and sustained on pipes 24 that close the interspacing 23 at the edges of the wing. That wing is supported in a horizontal position by demountable means consisting of two rods frames 25 pivotally mounted at their lower ends as horizontal pivots on brackets 26 attached to the platform 2, said frames having a normal position inclined inward and upward and their upper part being attached to the wing by means of clamps 27 rotatable on horizontal pivots 28 attached to brackets 29, fixed by means of rivets 30 to the double wall wing 21—22, said clamps being separably secured to bolts 31 that pass through the double walled wing 21, 22 by means of keys 32 rotatable on the lower ends of said clamps 27, and which in one of its positions cause the bolts 31 to engage grooves 33 on free ends of said clamps, and release same in the other position (Figs. 10 and 11). The fuselage is reinforced by means of tie rods 34 connecting posts 9 and 10 to platform 2 and which is reinforced by the rods 35, inclined to either side that join same to platform 2. In the rear portion, the wing 21, 22 rests on a rod or tube frame 36 set up on platform 2 in a transverse plane and formed by two posts joined by an upper horizontal brace forming in its middle point a V like downward inset 36' (Fig. 5) and said frame 36 is reinforced by tie rods 37 attached to platform 2. The wing 21, 22 on its rear portion or tail, forms a horizontal frame 38 with a projecting portion offset backwards in V like form 39, and on this frame is oscillatorily mounted the depth rudder 41, rotatable on hinges 40, the extreme rear portion of which rudder is joined by means of a coil spring 41' with the end of said V like offset 39, said rudder being operated by means of a cable or wire 42 that starts from a ring bolt 43 above its rear portion and is guided forward in the middle longitudinal line of the fuselage by means of two pairs of vertical guiding pulleys 44 and 45 rotatably mounted on two brackets 46 and 47 transversely fixed on the wing 21, 22, the cable or wire 42 passing thereafter through a hole 48 bored in the wing to be guided downwards by a vertical pulley 49 rotatably mounted on a bracket fixed to the lower face of the wing, and upon reaching approximately the position of platform 2, the cable or wire 42 is led backwards by means of a vertical guiding pulley 50 rotatably mounted on the end of a horizontal shaft 51 mounted on a stand 52, said cable 42 clamping around a channel in the periphery of a horizontal wheel 53, the vertical shaft of which 54 is rotatable on a stand 55 fixed to the platform 2 and which shaft carries on its upper end the rudder control wheel 56 which is actuated upon by the pilot; the cable 42 then passes around another vertical pulley 57 located on the other end of the horizontal shaft 51, to be led upwards and then backwards by means of two pairs of guiding pulleys 58 and 59 rotatably mounted on brackets 60 and 61, fixed to the lower face of the double walled wing 21, 22, said cable 42 ending in a ring bolt 62 fixed to the lower face of the double walled wing on its rear edge.

The driving rudder consists of a rudder similar to those used on ships, or a vertical plane 63 attached to a vertical shaft 64, pivotally supported in brackets 65 and 66, one upper and one lower, both fixed to the floats 1, said shaft 64 being operated from the pilot's cockpit by means of a cable 67, the ends of which are joined to the ends of a cross arm 68 attached to the shaft 64 and connecting with a chain 67' that passes around a clamping channel grooved on the periphery of a horizontal wheel 69 fixed on a vertical shaft pivotally supported in a stand 71 attached to platform 2, and carrying on its upper end a driving wheel 72.

The operation of this craft is just like that of the already known aircraft, with the features of its navigating the air and the water alike, as a hydroplane, and that it may also run over the ground as the aeroplanes by means of the landing sets located below the floats or cages 1, and that it may navigate in water like a ship by means of the propelling rear screw 8, and it being steered, either in air or water, by means of the driving rudder 63. In order to climb or descend in the air whilst moving horizontally, the depth rudder 41, located at the tail, may be used, and in order to ascend or descend directly, the propeller 16 with its vertically located shaft is the one employed, as already explained, said propeller being maintained in a horizontal position (Fig. 7) when the craft has to move horizontally. In order to travel on the ground, the wing 21, 22 is preferably detached from its horizontal position, to which end the holding clamps 27, that maintained the wing onto the side supporting structures 24, are first untied, then cable 42 leading to the driving rudder is interrupted in a suitable clamping point or joint, and the whole wing is rotated about the horizontal pins 19 and when the wing has come to an angle of ninety degrees off its normal position (Fig. 5), the wing is made to swing on the vertical shaft formed by the vertical pivot 17, until it is on the vertical position shown by the full lines of Fig. 7, in which position the wing stays annexed against a side of the raised structure 36, and is reinforced by means of pairs of braces 73 and 74 that attach the wing to platform 2. In this position in which the wing is raised upwards and following a downward inclined angle, the same may serve as a sail for maritime navigation and in running over the ground constitutes no hindrance for the motion of the craft along a road or highway, because in this condition, the craft will but occupy a span not larger than the one covered by other vehicles travelling on said roads.

It is apparent that the construction details of the craft may be varied, as well as the form of component parts without altering the essential character of the invention which is as hereinafter claimed.

What I claim is:—

1. An aircraft having a wing rotatably mounted upon a transverse horizontal shaft, a yoke shaped support that holds said horizontal shaft in position and is in turn rotatable upon a vertical shaft located in the middle longitudinal line of the craft, a mounting arising in the forward end of the aircraft, and supporting said vertical shaft and lateral demountable holding means for said wing.

2. An aircraft having on its forward end a mounting upon the upper part of which is a yoke shaped piece, mounted upon a vertical shaft, said yoke shaped piece being symmetrically placed with regard to the middle longitudinal line of the aircraft, said yoke shaped piece being articulated to the wing by means of two horizontal transverse pivots, lateral holding frames for the wing, said frames being rotatably joined to the frame of the aircraft and clamps for joining these frames to hold them onto the wing, said clamps being rotatably connected to the wing and embracing a section of these frames, being separably retained by bolts which are fixed to the wing by means of rotary keys.

In witness whereof I affix my signature.

JOSÉ BILBAO.